United States Patent Office

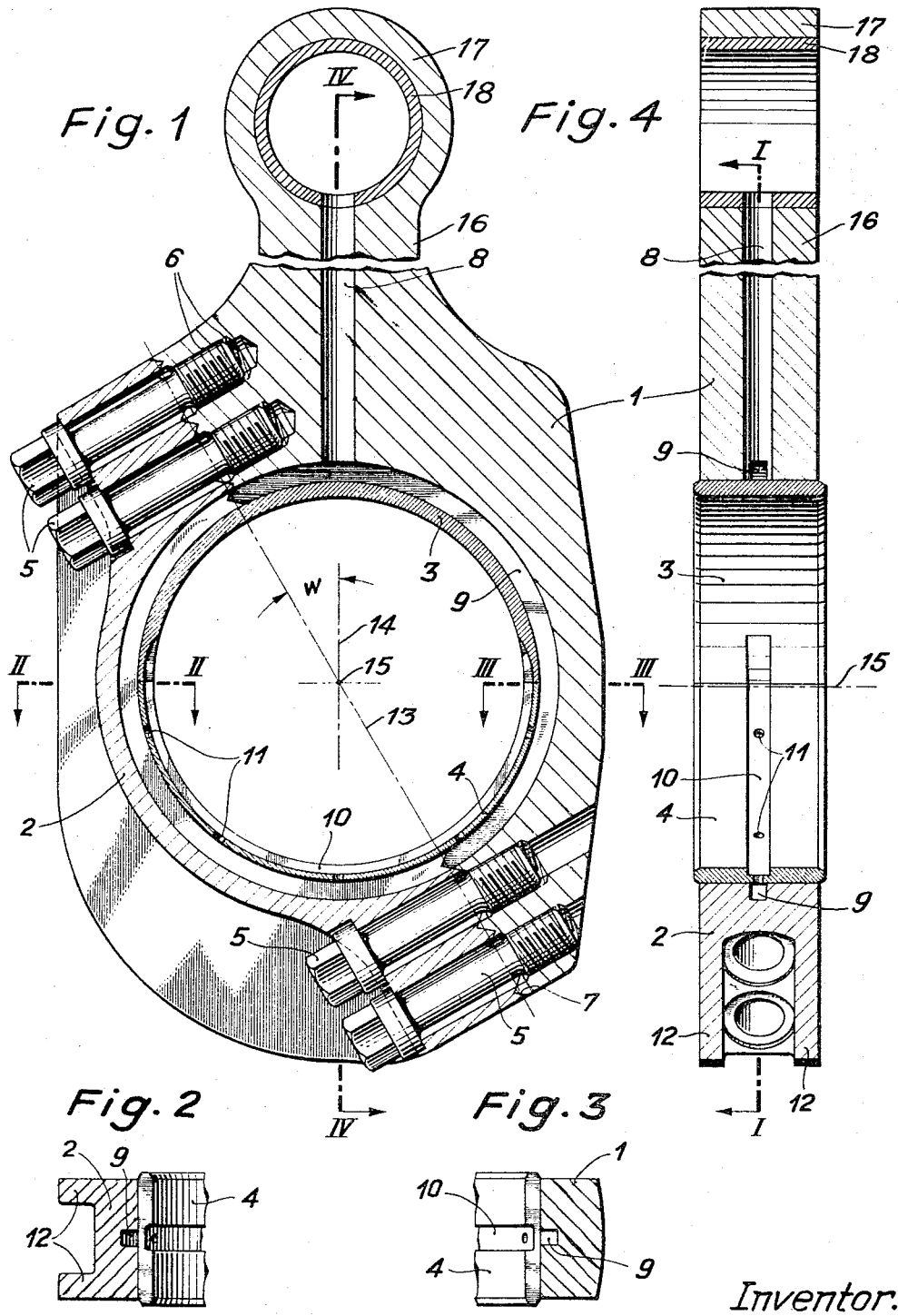

3,314,305
Patented Apr. 18, 1967

3,314,305
SPLIT CONNECTING ROD
Arnold Friedrich, Winterthur, Switzerland, assignor to Sulzer Brothers Limited, Winterthur, Switzerland, a Swiss company
Filed Feb. 16, 1965, Ser. No. 433,006
Claims priority, application Switzerland, Feb. 28, 1964, 2,571/64
4 Claims. (Cl. 74—579)

The present invention pertains to connecting rods for internal combustion engines, particularly diesel engines, and more particularly to a split construction for the crankshaft bearing end of such rods.

In diesel engines having trunk pistons it is necessary that the connecting rods and pistons shall be removable through the cylinder bores. In the usual construction of split connecting rods, the separation between the cap and the shank or body portion of the rod is along a surface perpendicular to the length of the rod. With increasing cylinder pressures, caused by the tendency to increased supercharging and which require increased diameter for the crankpins, and also with V-type engines in general, the usual construction above-described leads to difficulties in that the head or crankpin end of the connecting rod becomes so large that it cannot pass through the cylinder after removal of the cap which holds the rod to the crankshaft. Connecting rod constructions have been proposed in which the head is split along a direction oblique to the length of the rod. In view however of the bending moments arising in the head, it has been possible to incline the plane of separation only slightly with respect to the perpendicular so that the above-mentioned disadvantage has been only partially obviated.

In accordance with the invention the disadvantage mentioned is surmounted by inclining the plane of separation at an angle of less than 45° to the axis of the rod and by employing on both sides of the head, for securing the cap to the body of the rod, two screws at unlike separations from the axis of the crankpin bearing.

The invention will now be further described in terms of a non-limitative exemplary embodiment with reference to the accompanying drawing in which:

FIG. 1 is a sectional view of a connecting rod in accordance with the invention, this section being taken on the line I—I of FIG. 4; and FIGS. 2, 3 and 4 are sectional views taken respectively on the lines II—II, III—III and IV—IV of FIG. 1, the lower coupling screws being moreover shown removed in FIG. 4. In FIGS. 1 and 4 the shank of the rod has been broken away to permit showing the head end of the rod at a large scale.

FIGS. 1 and 4 illustrate fragmentarily a connecting rod according to the invention. The shank 16 of the rod, with a wrist pin bearing portion 17 and wrist pin bushing 18 at the upper end thereof may be conventional in nature. The head of the rod, which in service embraces a crankpin on the crankshaft of an engine, comprises a bearing saddle 1 and a cap 2. The saddle 1 is integral with the shank or body of the rod. The parts 1 and 2 (when assembled as shown in FIG. 1) surround and define a bore accommodating an anti-friction bearing shell for a crankpin. The shell is made up of two halves 3 and 4. The plane of separation of the two bearing halves 3 and 4 is substantially perpendicular to the length of the connecting rod (which length is vertical in FIGS. 1 and 4) and coincides with the two section planes II—II and III—III in FIG. 1.

The two parts 1 and 2 are fastened together with screws 5 of which each engages a thread 6 in part 1. The dividing surface between parts 1 and 2 comprises an indented surface 7. The connecting rod is provided in its shank with a longitudinal bore 8 for lubricating oil, leading into a groove 9 which extends in a circle around the exterior of both bearing shell halves 3 and 4. The lower half 4 is provided on its concave inner face with an oil groove 10 which connects with the groove 9 via radial bores 11. As is apparent from FIG. 2, the bearing cap 2 has a U-shaped section with lateral stiffening ribs 12. The portion of the saddle 1 enclosing or surrounding the bearing has in contrast a substantially rectangular, non-reentrant section, as is seen in FIG. 3.

In accordance with the invention the mating surfaces of the cap 2 and head 1, which may be plane except for the indentations thereof indicated at 7, are inclined to the axis or long dimension of the rod at an angle of less than 45°. In FIG. 1, the axis of the rod which may be parallel to the bore 8, is indicated by the chain line 14, and the plane of separation between the cap and body of the rod, to which the indented surface 7 generally conforms, is indicated by the chain line 13.

As is apparent from FIG. 1, the connecting rod head according to the invention possesses in planes perpendicular to the crankpin bearing axis 15 a profile which closely approaches the ideal profile of a closed, non-split connecting rod head. That part of the head seen in the section planes II—II and III—III has practically no bending moments to bear and is subjected instead substantially only to tensile stresses. It can therefore be provided with a relatively very small cross-section. This is particularly true since the screws customarily here present are absent from this location in the construction of the invention. Whereas the sections at II—II and III—III in a plane perpendicular to the length of the connecting rod suffer only tensile stresses, sections more and more nearly parallel to that length (such as for example the sections indicated by the line 13) suffer increasing bending moments and must consequently be given higher and higher profiles. That is to say, the sections on the line 13 have greater area of metal than those on the lines II—II and III—III. According to the invention, the plane of separation between the cap 2 and body 1 is disposed in this region of high profiles, so that the angle W between the plane of separation 13 and the axis 14 of the rod is smaller than 45°. The bending moment appearing in this plane is borne or carried by the screws 5. To this end the screws are disposed not adjacent to each other, i.e. not with the same spacing from the axis 15 of the crankpin bearing, but are rather spaced from each other in a plane perpendicular to that axis as indicated in FIG. 4. The screws thus lie in a plane perpendicular to the axis of the connecting rod.

By means of this arrangement it is possible to hold to small dimensions the lateral profile of the head, and particularly of part 1 thereof, i.e. to hold to small dimensions the sections of the head in planes (such as that of lines II—II and III—III) perpendicular to the length of the connecting rod (i.e. to the bore 8) and which contain the crankpin axis 15. This permits the connecting rod to be passed through the cylinder notwithstanding a strengthened construction for the rod.

In addition there is obtained the advantage, notwithstanding the provision of two screws on each side of the bearing shell, that the connecting rod head is very thin in the direction parallel to the axis 15 of the crankpin bearing. This is particularly advantageous for the construction of engines which are short parallel to the length of the crankshaft, or in V-type engines in which each crankpin carries two connecting rods.

As is apparent from FIGS. 1 and 2, the cap 2 has a U-shaped cross-section with side ribs 12. This produces a lighter construction for a given capacity for withstanding bending moments. The connecting rod body 1 with the bearing shell seat or saddle on the contrary shows at the corresponding position (section III—III), a substantially rectangular, non-reentrant profile. The requirement of a low height profile is crucial at this location if the rod is to be passed through the cylinder bore. If ribs were to be employed here, the consequence would be an increase in the height of the profile, even though a saving in weight might be achieved thereby.

The transmission of the shear stresses between the parts 1 and 2 occurs in the construction according to the invention by means of the indentation 7 of the mating surfaces of the rod body 1 and its cap 2. In this way there is achieved the optimum transfer of these stresses having regard to distribution thereof along the profile. It is however possible to use other types of mating surfaces in conjunction with the invention.

The connecting rod according to the invention permits a ratio of cylinder diameter to crankpin diameter smaller than was heretofore possible, consistent with passage of the connecting rod through the cylinder. At the same time, the construction of the invention makes it possible to reduce substantially the thickness of the connecting rod head in the axial direction longitudinal of the crankshaft, i.e. in the direction of the axis 15, by comparison with prior art constructions in which two bolts were employed side by side, parallel to the direction of that axis.

It is not necessary for the screws to lie in a single plane perpendicular to the crankpin bearing axis 15. Instead it is possible to dispose the screws obliquely to the bearing axis, provided only that the screws on each side possess unlike spacings from that axis. In addition, more than two screws may be employed on each side.

While the invention has been described herein in terms of a preferred embodiment, the invention embraces all modifications thereof and departures therefrom properly falling within the spirit and scope of the appended claims.

I claim:

1. A connecting rod comprising a cap and a shank, the shank having a wrist pin bearing portion at one end, a crankpin bearing portion at the other end, and a bore for the passage of lubricant extending from the crankpin bearing portion to the wrist pin bearing portion, the cap and shank having mating surfaces lying in a plane containing the axis of the crankpin bearing and inclined at less than 45° to the length of the shank, the crankpin bearing portion of the shank having formed therein two pluralities of blind, tapped holes without communication with the bore, the holes of each of said pluralities having unlike spacings from the axis of the crankpin bearing, said connecting rod further comprising two pluralities of screws passing through the cap and threadedly engaging said holes to hold the cap against the shank.

2. A connecting rod according to claim 1 wherein the screws of both of said pluralities of screws lie in a plane perpendicular to the axis of the crankpin bearing.

3. A connecting rod according to claim 2 wherein the cap has a U-shaped section in planes containing the crankpin bearing axis, the U-shaped section being formed by flanges on both sides of the plane wherein said screws lie.

4. A connecting rod according to claim 3 wherein the crankpin bearing portion of the shank has a substantially rectangular non-reentrant section in planes containing the crankpin bearing axis.

References Cited by the Examiner
UNITED STATES PATENTS

| | | | |
|---|---|---|---|
| 1,669,268 | 5/1928 | Swoyer | 74—579 |
| 2,473,096 | 6/1949 | Hamill et al. | 74—579 |

FRED C. MATTERN, Jr., *Primary Examiner.*

W. S. RATLIFF, *Assistant Examiner.*